United States Patent Office 3,817,703
Patented June 18, 1974

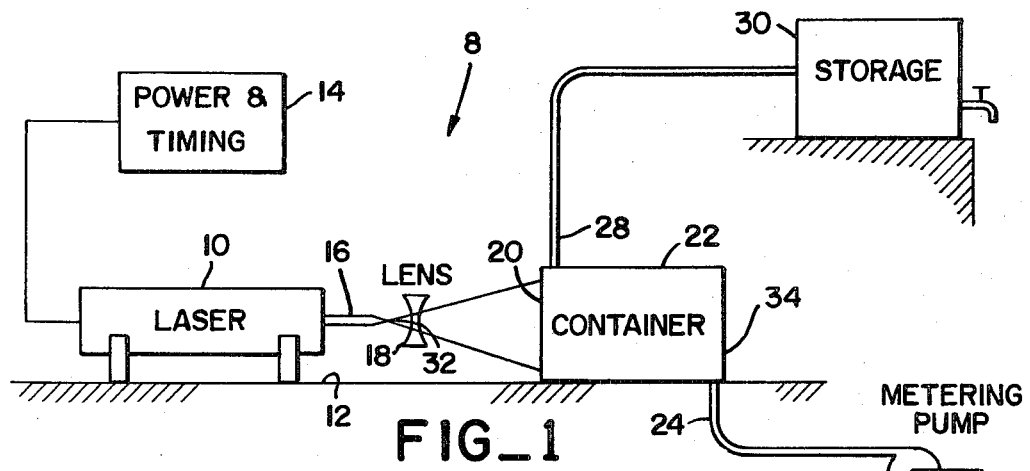
FIG_1
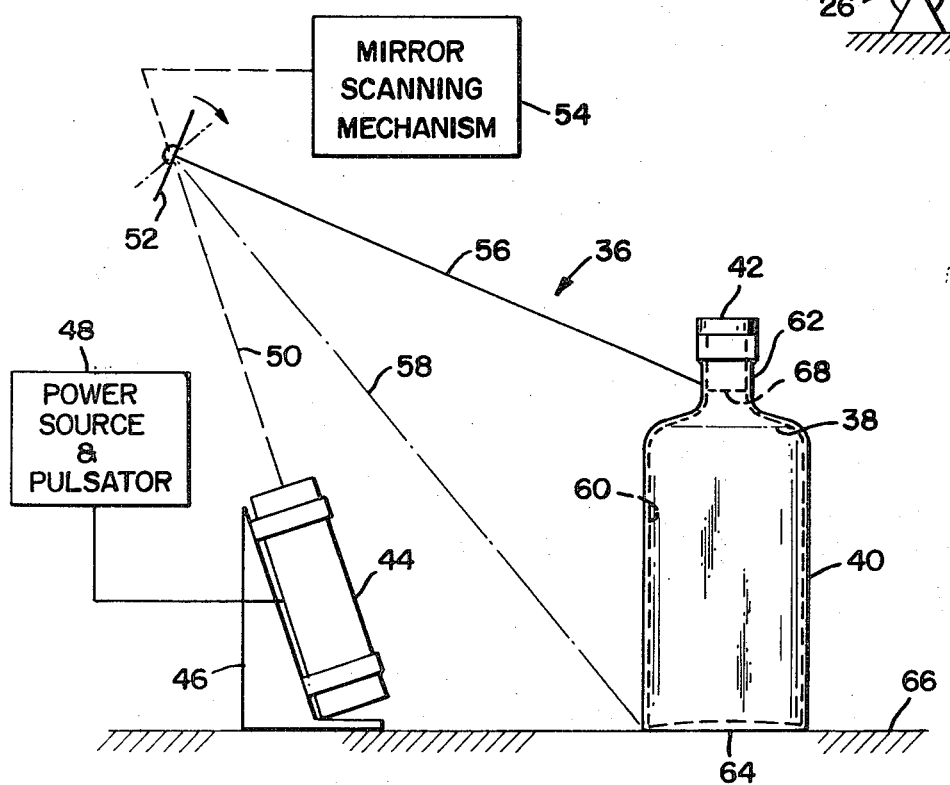
FIG_2

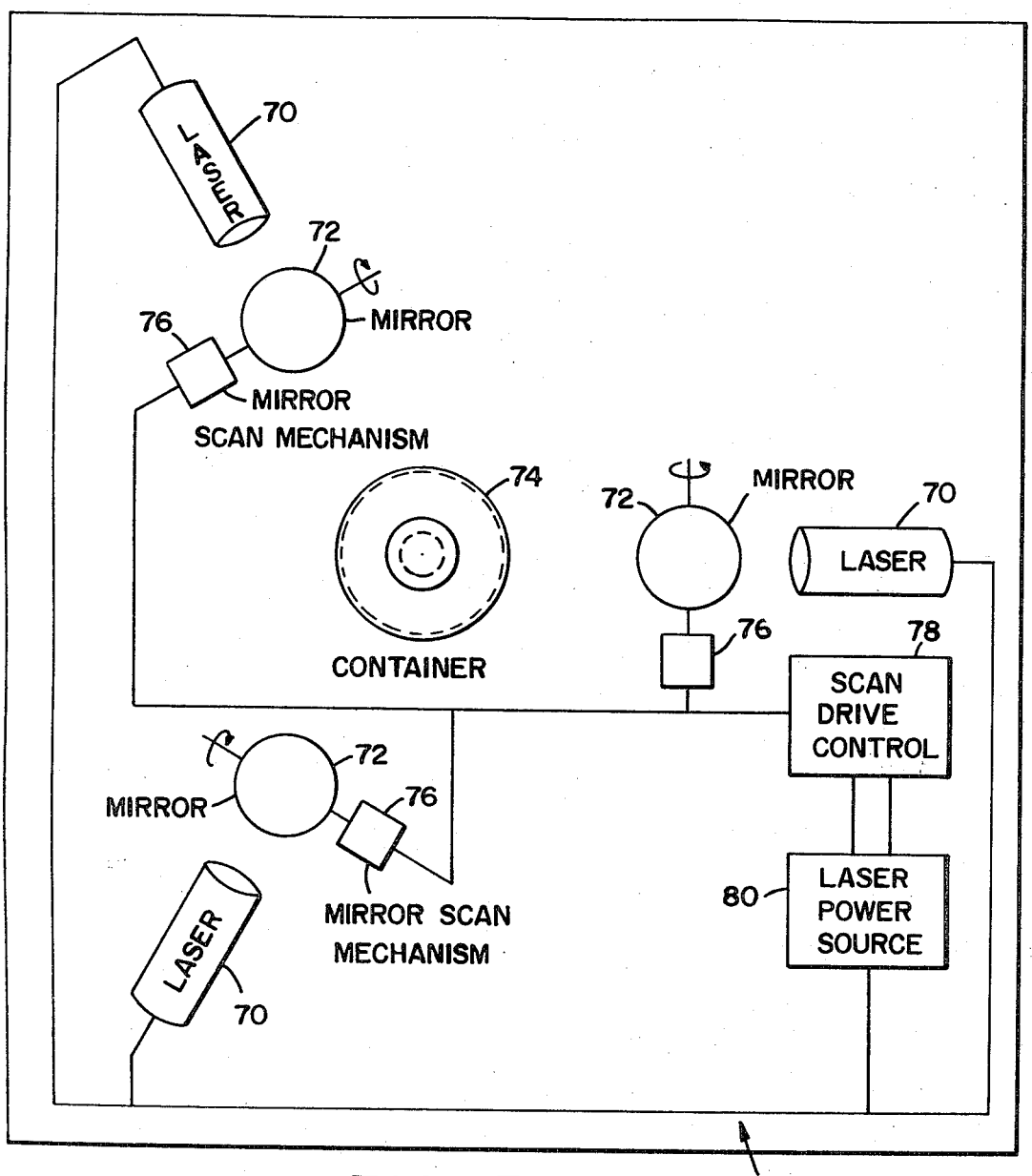
FIG_3
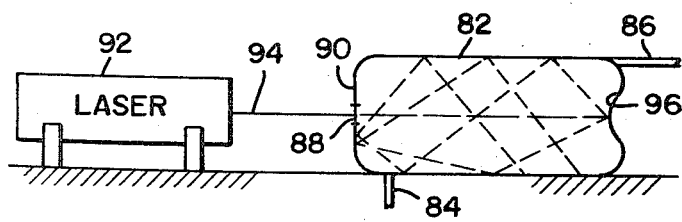
FIG_4

3,817,703
LASER ENERGIZED STERILIZATION METHOD AND APPARATUS
Richard W. Atwood, Mill Valley, Calif., assignor to Filtering Materials Inc., Richmond, Calif.
Continuation-in-part of application Ser. No. 803,906, Mar. 3, 1969. This application Sept. 9, 1971, Ser. No. 178,959
Int. Cl. A61l 3/00, 1/00; A23l 3/26
U.S. Cl. 21—2      9 Claims

ABSTRACT OF THE DISCLOSURE

A method and apparatus for the sterilization of food, beverages, medicines, medical supplies, etc., in which a high energy density light beam, such as a laser beam, is projected through the material and thereby contacts and destroys all living matter suspended in the material and having an absorption at a wavelength approximate the wavelength of the light beam. The wavelength of the light is further selected so that the material is transparent to the light at the selected wavelength.

RELATED APPLICATIONS

This patent application is a continuation-in-part application of co-pending application, Ser. No. 803,906, filed Mar. 3, 1969, for Light Energized Sterilization Method and Apparatus, now abandoned.

BACKGROUND OF THE INVENTION

This invention relates to a method and apparatus for sterilizing materials and more particularly to a method and apparatus employing high energy density light which is passed through the material to destroy all living matter suspended therein and which has a wavelength selected to prevent the absorption of light energy by the material.

The sterilization of materials by killing living matter suspended therein is common to the food industry, beverage industry, pharmaceutical industry, space industry, etc. The sterilization process encompasses the material or substance to be used, such as milk, wine, or a pharmaceutical preparation for an intravenous injection, as well as the package or container in which the substance is shipped and stored.

The most common form of sterilization, namely by heating the substance, is well known. The prior art also knows more refined methods which include the sterilization of substances with chemicals and the sterilization by subjecting living matter in the substances to radiation such as X-rays, gamma rays or ultraviolet light.

Certain undesirable side effects accompany prior art sterilization methods since they often alter the characteristics of the sterilized product. The addition of chemicals to food products often leaves unpleasant aftertastes which limit the application of chemicals. The treatment of products with conventional high energy radiation results either in a temperature rise or undesirable radiation exposure of the substance, which in turn may affect the taste, color or consistency of the substance. Thus, such sterilization methods may lower the quality of the products, particularly in the case of food products which rely on taste and appearance for their appeal. Additionally, high energy radiation treatments can increase the radioactivity of products beyond tolerable limits.

Various other forms of radiation have been employed; however, certain types of radiation which are effective in destroying living matter very often produce ionization or other chemical changes which adversely affect the end products. This is particularly true, for example, in wine where gamma radiation will change the color of red wine. It is also noted that even ultraviolet lights with relatively long exposure can affect wine and beer coloration.

In spite of these shortcomings one or the other of such prior art methods have been employed whenever sterilization is necessary. There is, however, at the present a need for an economic sterilization method and apparatus which permits an efficient and effective sterilization without deleterious side effects.

SUMMARY OF THE INVENTION

The present invention provides a method for destroying living matter suspended in light transmissive material. Briefly, the method comprises the steps of subjecting the material to a high energy density light rays having a wavelength to which the material is transmissive so that the light passes through the material with negligible energy losses. All living matter having an absorption to the selected wavelength of the light rays absorbs light energy and is destroyed by the light rays.

In the presently preferred embodiment of the invention a laser is provided for discharging a high energy density light beam of a wavelength to which the material is transparent so that the light beam can pass through the material with no or only negligible energy losses. In this method the temperature of the material remains essentially constant during the sterilization process. As the light travels through the material it contacts all living matter or particles suspended therein. Those which absorb at a wavelength of the light beam are destroyed.

To prevent the shadowing or shielding of living particles by living matter which is closer to the laser it is preferred to project laser light through the material in two or more directions whereby all living matter is subjected to the light beams and destroyed thereby. As more fully set forth in the following specification, means to reflect and/or scan the laser beam over the material being sterilized can be provided as an alternative to employing two or more lasers.

The present invention permits the economic sterilization of substances, particularly of such substances which are taste or color change sensitive and which have heretofore presented sterilization problems. Thus, such delicate products as wines may be sterilized to destroy living matter suspended therein by exposing it to a laser beam of the proper frequency. The character of the wine remains essentially constant during the sterilization process, since the laser beam travels freely through the transparent wine. Since light rays of even high energy density during the time-energy level employed do not affect the properties of the wine, the sterilized wine has a taste and appearance which is not affected by the sterilization procedure. When sterilizing wines according to prior art methods such results were difficult or impossible to achieve.

Aside from the above-enumerated advantages provided by the present invention it is further possible to simultaneously sterilize containers and materials stored therein after the former have been closed. Accordingly, a laser beam is directed at the container so that it contacts all interior surfaces of the container during the sterilization process and thereby also subjects all of the material in the container to the light rays. Living matter suspended in the material or clinging to the interior container walls is thereby destroyed. Separate sterilization of container and fillant usually results in great danger of a subsequent contamination of containers from the entrance of nonsterilized air. The resulting manufacturing problems, and, not least, economic waste resulting therefrom have been eliminated.

BRIEF DESCRIPTION OF THE DRAWINGS

FIG. 1 is a schematic view of the sterilization apparatus constructed according to the present invention as applied to a system for the sterilization of a continuously flowing liquid material;

FIG. 2 is a schematic elevational view of a sterilization apparatus constructed according to the present invention as applied to the sterilization of individual, closed containers for sterilizing interior surfaces of the container and the material stored in the container;

FIG. 3 is a schematic plan view of a container sterilization apparatus in which a plurality of light sources are disposed about the container; and FIG. 4 is a fragmentary, schematic elevational view of another sterilization apparatus constructed according to the present invention.

DESCRIPTION OF THE PREFERRED EMBODIMENT

Referring to FIG. 1, a sterilization apparatus 8 constructed according to the present invention comprises a laser 10 conventionally mounted to a supporting surface 12 and electrically coupled to a power supply 14. A laser or monochromatic light beam 15 may be projected through one or more lenses 18 and then past a transparent section or side 20 of a container 22 into the interior of the container. Container 22 is illustrated to comprise a flow tube having an inlet 24 which communicates with a metering pump 26, and an outlet 28 fluidly connected to a storage tank 30.

Although conventional lasers emit monochromatic light, some recently developed lasers are capable of emitting light with two or more distinct wave lengths. If the carrier fluid is transparent to all such light, then multiple wave length lasers can also be employed. The term "laser" as used in this specification and in the claims, therefore, includes such lasers.

Fluent material, such as a gas or a liquid, to be sterilized and transported from metering pump 26 to storage tank 30 via container 22 is sterilized according to the method of the present invention as follows. Before the fluent material from the container enters outlet 28 power supply 14 is actuated to energize laser 10 which, thereafter, directs its laser beam 16 into the container. Lens 18 is constructed so that the laser beam is made to diverge so that the cross-section of the beam covers the area of side 20 facing the laser. Consequently, laser light rays enter over the full cross-section of container 22 and subject the whole volume of the container to laser light.

The laser is further selected so that the emitted light has a wavelength to which fluent material disposed in container 22 is transparent. Thus, the material to be sterilized determines the necessary output frequency of the laser. As a result of the wavelength of the laser light and transparency of the material the latter appears transparent to the laser light and the light travels freely through it. Virtually no energy-transfer between the laser light and the material takes place so that the contaminents can receive sufficient energy to cause sterilization.

Generally speaking, the required laser frequency is determined by testing the carrier liquid in a standard spectrophotometer to determine to which light frequency the liquid is transparent. A laser exhibiting the thusly determined light frequency is then selected for destroying living matter in accordance with this invention.

Contaminents, mainly living matter such as algae, bacteria, fungus, mold, yeast, etc., are suspended in the material, which may be wine for example, and must be destroyed before the wine is stored to prevent damage to and the eventual deterioration of the wine by such living matter. Living matter that absorbs light at a wavelength to which wine is transmissive, and that includes usually all of the living matter suspended in the wine, is struck by the laser light. Light energy is thereby transferred to the living matter, and if the energy density of the laser beam is of a sufficient magnitude it destroys (e.g. kills, prevents reproduction or otherwise renders the living matter inactive).

For a practical matter the required energy density of the laser beam is too high for many presently available lasers. It is, therefore, preferred to employ a Q-switch laser which emits brief light pulses lasting no more than about a microsecond and usually only a few (up to about 30) billionths (10–9) of a second. The energy density obtained from Q-switch lasers should be amply sufficient to destroy living matter suspended in the wine and of a short enough duration to avoid undesirable effects to the wine itself.

Moreover, it is not necessary to continuously subject the living matter to light pulses, or to pulse the living matter as it passes fluid container 22. The destruction of the living matter is instantaneous and a single light pulse can be sufficient therefore. Thus, power supply 14 may be constructed to further periodically energize the Q- switch laser to emit single, periodic light pulses or bursts.

For the destruction of living matter such as yeast cells, bacteria, mold and the like power densities in the range of between about $10^5$ to about $10^{12}$ watts/cm.$^2$ are required. Thus, for the destruction of yeast cells in wine (white or red) a Q-switched rubi laser emitting light bursts of a power density of about $6.4 \times 10^6$ watts/cm.$^2$ that last for about $20 \times 10^9$ seconds was employed. For the destruction of bacteria the power density is increased to about $10^8$ to $10^{10}$ watts/cm.$^2$. For the sterilization of other fluids a laser emitting light of a frequency to which such fluid is transparent might have to be substituted. The required frequency is a function of the fluid to be treated and is readily determined by those skilled in the art. Moreover, since light is dissipated by living matter being destroyed a high population density generally requires the use of higher power densities. For commonly encountered fluids maximum power densities of about $10^{12}$ watts/cm.$^2$ are usually sufficient. Since the living matter is instantaneously destroyed by the light the light burst duration can be shortened to obtain the necessary higher densities. Alternatively, a laser having a higher power rating can be employed.

In selecting a laser having the necessary power rating, a test sample of the carrier liquid including the organisms to be destroyed is subjected to increasing power densities. After the sample has been subjected to the laser radiation, standard biological tests such as plating out tests are performed on the sample to determine whether or not life is still present in the sample. If life is found, the power density is increased and the test is done over again.

To assure that each particle of the liquid passing through the container is subjected to a light pulse the laser may be energized at least once during the minimum time it may take a liquid volume to enter the container at inlet 24 and leave the container at outlet 28. To maintain a close control of the rate at which the liquid passes through container 22 pump 26 is preferably a pump having a controlled volumetric output that may be variable in which case the pump is operatively coupled with the timing element of power supply 14 in a conventional, well-known manner. The emission of short lasting pulses limits the time periods during which energy can transfer from the laser beam to the liquid in the container while instantaneously subjecting the living matter to destructively high temperatures.

A light ray of the laser beam striking a living particle, such as a bacterium, is at least partially absorbed by the particle and does not continue to travel through the liquid in the container. Consequently, each time a particle absorbs part of the laser ray it forms a "shadow" behind it and reduces or eliminates the subjection of particles disposed within that shadow to laser light rays. Thus, certain of the particles might not be contacted by laser light and may remain alive. Complete destruction of all living matter in the liquid is, however, generally mandatory to prevent even a single remaining active bacterium, alga or other living matter from again multiplying. It is, therefore, preferred to direct laser light rays through the liquid in the container in a plurality of directions.

In one embodiment of the invention this is accomplished by constructing side 34 of the container, which is opposite from transparent side or section 20, as a reflector. Thus, side 34 may be constructed of a light ray diffusing, reflecting material, or of glass provided with a reflecting silver film, or an independent reflector or mirror (not shown) may be positioned exteriorly of the container, whereby laser light is reflected back through the liquid in container 22. Living matter disposed in the shadow of other living particles when the laser beam enters through transparent side 20 is now subjected to the reflected laser light and destroyed thereby as described above.

Referring to FIG. 4, in another embodiment of the invention the sterilization of liquid stored in a container 82, which may be a flow-through container as illustrated or a closed container, is further enhanced by coating the container walls with a reflective material, such as a silver film, or by constructing the container walls of polished, reflective material such as metal, a diffused reflection can also be used to good advantage. Container 82 includes an inlet 84 and an outlet 86 and a transparent section 88 in a wall 90 of the container facing a laser 92 and permitting the entrance of a laser beam 94 into the interior of the container. A wall 96 of the container opposite wall 90 is curved or may be angularly inclined with respect to wall 90 so that the laser beam is reflected in a direction nonparallel to the direction of the laser beam. The reflected laser beam is then reflected by the walls of the container a multiplicity of times, each time taking a new direction until the energy of the laser beam is dissipated. Since all interior walls of the container are reflective, except for the relatively small areas covered by the inlets and outlets and by the transparent section, a great number of reflections take place and the reflected laser beam traverses the fluid material in the container many times and in many directions. Complete coverage of all fluid material in the container and the elimination of virtually any possibility of the earlier referred to shadowing effect with the resulting danger of nondestruction of some of the living particles is thereby obtained with a single pulse from the laser. This provides for the high efficiency of the sterilization process both in terms of power requirements and thoroughness of the destruction of the living particles.

Sterilization apparatus 8 illustrated in FIG. 1 may, of course, be modified for particular applications. Thus, lens or lenses 18 may be omitted by providing container 22 with a cross-section equal to that of the laser beam 16. A change of the liquid passing through container 22, as a change in the color between red and white wines, may require a replacement of laser 10 with one emitting light having a wavelength equal to that for transparency of the new liquid.

It is further not necessary that the liquid flow through container 22. Individual containers may be placed adjacent laser 10 and the latter may be energized to destroy all living matter in the container. Thereafter, another container is moved into the path of laser beam 16 to destroy all living matter in that container. Lastly, it is not necessary that the substance to be sterilized be a liquid as long as it permits the passage of laser light therethrough. Thus, the material being sterilized may comprise ice cubes or living matter clinging to interior surfaces of transparent containers such as glass bottles.

Referring to FIG. 2, a sterilization apparatus 36 is adapted for the sterilization of liquid material 38 disposed in closed containers such as a glass bottle 40 sealed by a conventional cover 42. The apparatus comprises a laser 44 secured to a support structure 46 and operatively connected to a power supply 48. In this embodiment of the invention the laser does not direct its laser beam 50 at the glass bottle or the liquid material disposed therein, but projects it onto a mirror 52 which is pivotable between a first and a second position (the latter is shown in phantom lines) by a mirror scanning mechanism 54. The relative positions of the glass bottle, the mirror in its first position and the laser is such that at the beginning of the scanning motion of mirror 52 it projects the laser beam as indicated by a solid line 56. When the mirror is at its second position (in phantom lines) it projects laser beam 50 along a broken line 58. The angular distance between the two lines is so adjusted that it covers all interior surfaces 60, of the glass bottle and, therefore, that it covers all of the liquid material 38 during a scan of the mirror between its first and second position.

In operation a glass bottle 40 is placed so that it is within the sweep of the laser beam as projected by the pivoting mirror 52. The power supply is actuated to energize the laser, which may be a continuous wave or a pulse laser, and the successive downward movement of the projected laser beam from a neck 62 of the bottle to a bottom 64 subjects every portion of the liquid material in the bottle to the living matter destroying action of the laser beam. Thus, the laser beam moves in a continuous path through the liquid and when the projected laser beam arrives at the bottom of the bottle (as indicated in the broken projected lines 58) it has contacted every particle of the liquid. All living matter suspended in the liquid of the bottle is thereby destroyed.

The laser beam destroys all living matter which may cling to the interior surfaces 60 of the bottle. Such matter may have been deposited thereon prior to or after the filling of the bottle with the liquid material. Consequently, the bottle and the liquid material are simultaneously sterilized. A separate sterilization of the two prior to the introduction of the liquid in the glass bottle is therefore not necessary. Two sterilization processes have thus been combined into one. More importantly, however, the danger of new contamination of either the liquid material or the interior surfaces of the glass bottle from non-sterilized gas and/or air entering into the empty bottle after it has been sterilized, or from the inclusion of living matter during the filling of the bottle with the fluid material is eliminated. The present invention, therefore, enables a substantially more hygenic and economic sterilization of liquid filled containers.

The glass bottle is so positioned on supporting surface 66 that all of its interior surfaces, including surface 68 of cover 42 facing the interior of the bottle, are sterilized. If cover 42 is constructed of a light transparent material, such as glass, the bottle may be positioned as illustrated in FIG. 2. If, on the other hand, the cover is not light transmittant then the bottle is laid horizontally so that the laser beam projected by mirror 52 can also reach that surface of the cover.

The sterilization apparatus illustrated in FIG. 2 is ideally suited for the assembly line sterilization of large numbers of containers, such as wine bottles, milk bottles, beer bottles, medicine bottles, etc. The power supply for laser 44 preferably includes a timing device to de-energize the laser during the time intervals no bottle is within the sweep of the laser beam projected by mirror 52. The timing device may be controlled according to any one of several well-known methods which sense the presence of a bottle at the sterilization station adjacent laser 44 and mirror 52.

Referring to FIGS. 2 and 3, the simultaneous sterilization of containers and of fluid material stored therein also requires that all living matter is destroyed. Thus, the earlier referred to shadowing effect of living particles closer to the light source must be overcome. Accordingly, it is preferred to dispose a plurality of lasers about the container to project laser light into the container from a plurality of directions.

Referring more specifically to FIG. 3, which shows sterilization apparatus 69, three equally spaced lasers 70 direct their laser beams via scanning mirrors 72 toward container 74. The scanning mirrors are operatively coupled to scan mechanisms 76 and they in turn are energized by a scan drive control 78. A laser's power source 80 energizes laser 70 and is electrically locked to the scan drive control so that the two function simultaneously. Energization of the lasers by power source simultaneously direct laser beams from all lasers towards container 74 and simultaneously energizes the mirror scan mechanism so that the laser beams projected by mirrors 72 simultaneously scan the container from one end to the other. In this manner no living particles can escape from being subjected to the high energy density light from the lasers even if the particles should move within the container. The earlier referred shadowing effect and a possible escape of living particles from destruction is eliminated. In all other respects the construction and functioning of the sterilization apparatus illustrated in FIG. 3 follows the construction and operation of the sterilization apparatus 36 illustrated in FIG. 2.

Further modifications in the construction of sterilization apparatus 69 can be made. For example, the number of lasers disposed about the container may be varied, particularly for odd shaped containers. Scanning mirrors 72 may be eliminated if the size and shape of the container is such that the laser beam can reach the full interior of the container without the scanning motion. In addition, instead of providing scanning mirrors the lasers may be pivoted or the container may be moved with respect to a stationary, fixed laser. Optical or electronic lens systems, as illustrated in FIG. 1, may be provided to suitably adjust the cross section and/or light density of the laser beam.

While several embodiments of this invention have been shown and described, it will be apparent that other adaptations and modifications can be made without departing from the true spirit and scope of this invention.

I claim:

1. A method for destroying living matter suspended in a light transmissive fluid comprising the steps of determining a light wavelength to which the fluid is transparent, providing a laser, and subjecting the fluid to short bursts of light from the laser having a power density of at least $10^5$ watts/cm.$^2$, the laser light having a wavelength within the transparent region of the fluid so that the light passes through the fluid with negligible energy loss while the living matter absorbs light energy and is destroyed by the laser light.

2. A method according to claim 1 wherein the power density is in the range of between $10^5$ to about $10^{12}$ watts/cm.$^2$.

3. A method according to claim 1 wherein the fluid is a pharmaceutical preparation.

4. A method according to claim 1 wherein the fluid is a food product.

5. A method according to claim 4 wherein the fluid is a beverage.

6. A method according to claim 5 wherein the beverage is wine.

7. A method for destroying living matter suspended in a light transmissive fluid, the living matter having a light absorbing region which is the same as a light transmitting region of the fluid, the method comprising the steps of passing monochromatic light pulses lasting for less than $10^{-2}$ second of high energy density light rays through the fluid, said pulses of light having a power density of at least $10^5$ watts/cm.$^2$, the light rays having a wavelength which is within the region of light absorbancy of the living matter and the light transmissivity of the fluid, whereby the living matter suspended in the fluid absorbs energy from the light rays and is destroyed.

8. A method for destroying living matter suspended in a fluent light transmissive material comprising the steps of determining a light wavelength to which the material is transparent, and subjecting the material to short bursts of high energy density laser light rays from a plurality of light sources disposed about the material to direct light rays at the material from different angles, the light rays having a wavelength within the transparent region of the material so that the light passes through the material with negligible energy losses while the living matter absorbs light energy and is destroyed by the light rays, and simultaneously energizing all light sources so that living matter cannot shadow and prevent the destruction of other living matter.

9. Apparatus for destroying living matter suspended in a fluid, the living matter absorbing light of a given wavelength, the fluid being transparent to the wavelength, the apparatus comprising: a high energy density monochromatic light source emitting light of a wavelength to which the liquid is transparent, the light source including means for pulsing the source to emit light lasting for a short time duration and means providing a light energy density sufficient for destroying the living matter during the short time duration when the living matter is struck by the light, a container holding the material and having a light beam transparent section permitting passage of the light beam from the container exterior to the container interior, means for projecting the monochromatic light into the material, and a reflecting surface formed by one of the interior surfaces of said container and reflecting the light beam in a direction non-parallel to the direction in which the light beam enters the container, and wherein substantially all of the other of the interior surfaces of said container are constructed to further reflect the light beams coming from the reflecting surface whereby the light beam traverses the liquid a multiplicity of times in a multiplicity of different directions.

References Cited
UNITED STATES PATENTS

| | | | |
|---|---|---|---|
| 3,458,140 | 7/1969 | Schryver. | |
| 3,346,741 | 10/1967 | Mayer et al. | |
| 3,405,045 | 10/1968 | Hoskins | 250—43 X |
| 2,669,661 | 2/1954 | Riddiford et al. | 21—102 R X |
| 2,648,774 | 8/1953 | Whitlock | 250—43 |
| 2,602,751 | 7/1952 | Robinson | 21—54 R |
| 3,503,804 | 3/1970 | Schneider | 21—54 R UX |

OTHER REFERENCES

Elion, H. A., Laser Systems and Applications, 1967, pp. 79-81, 174, 175.

McGuff, P. E. et al., The Effect of Laser Energy Radiation On Bacteria, 1966, pp. 191-194.

BARRY S. RICHMAN, Primary Examiner

U.S. Cl. X.R.

21—54 R, 91, 93, 102 R, Dig. 2; 250—432, 435; 426—238, 248